United States Patent
Park et al.

(10) Patent No.: US 12,437,185 B2
(45) Date of Patent: Oct. 7, 2025

(54) APPARATUS AND METHOD FOR ARTIFICIAL INTELLIGENCE NEURAL NETWORK BASED ON CO-EVOLVING NEURAL ORDINARY DIFFERENTIAL EQUATIONS

(71) Applicant: UIF (University Industry Foundation), Yonsei University, Seoul (KR)

(72) Inventors: No Seong Park, Seoul (KR); Sheo Yon Jhin, Goyang-si (KR); Min Ju Jo, Seoul (KR); Tae Yong Kong, Seoul (KR); Jin Sung Jeon, Seoul (KR)

(73) Assignee: UIF (UNIVERSITY INDUSTRY FOUNDATION), YONSEI UNIVERSITY, Seoul (KR)

(*) Notice: Subject to any disclaimer, the term of this patent is extended or adjusted under 35 U.S.C. 154(b) by 953 days.

(21) Appl. No.: 17/564,912

(22) Filed: Dec. 29, 2021

(65) Prior Publication Data

US 2023/0196071 A1    Jun. 22, 2023

(30) Foreign Application Priority Data

Dec. 17, 2021   (KR) .................. 10-2021-0181699

(51) Int. Cl.
*G06N 3/045*    (2023.01)
*G06F 17/13*    (2006.01)
*G06N 3/048*    (2023.01)

(52) U.S. Cl.
CPC ............ *G06N 3/045* (2023.01); *G06F 17/13* (2013.01); *G06N 3/048* (2023.01)

(58) Field of Classification Search
CPC ...... G06N 3/045; G06N 3/048; G06N 3/0442; G06N 3/042; G06N 3/084; G06N 3/08; G06N 3/049; G06N 3/063; G06F 17/13
See application file for complete search history.

(56) References Cited

FOREIGN PATENT DOCUMENTS

KR    10-2021-0031197 A    3/2021

OTHER PUBLICATIONS

Xia, Hedi, et al. "Heavy ball neural ordinary differential equations." Advances in Neural Information Processing Systems 34 (2021): 18646-18659. (Year: 2021).*
Li, Bei, et al. "ODE Transformer: An Ordinary Differential Equation-Inspired Model for Sequence Generation." (Year: 2021).*
Zhang, Jing, et al. "Continuous self-attention models with neural ODE networks." Proceedings of the AAAI Conference on Artificial Intelligence. vol. 35. No. 16. 2021. (Year: 2021).*

(Continued)

*Primary Examiner* — Miranda M Huang
*Assistant Examiner* — Sidney Vincent Bostwick
(74) *Attorney, Agent, or Firm* — Paratus Law Group, PLLC

(57) ABSTRACT

An apparatus for an artificial intelligence neural network based on co-evolving neural ordinary differential equations (NODEs) includes a main NODE module configured to provide a downstream machine learning task; and an attention NODE module configured to receive the downstream machine learning task and provide attention to the main NODE module, in which the main NODE module and the attention NODE module may influence each other over time so that the main NODE module outputs a multivariate time-series value at a given time for an input sample x.

12 Claims, 11 Drawing Sheets

(a) The original NODE architecture (b) Our proposed ACE-NODE architecture

(56) References Cited

OTHER PUBLICATIONS

Baier-Reinio, Aaron, and Hans De Sterck. "N-ode transformer: A depth-adaptive variant of the transformer using neural ordinary differential equations." arXiv preprint arXiv:2010.11358 (2020). (Year: 2020).*

Gao, Penglei, et al. "Explainable tensorized neural ordinary differential equations for arbitrary-step time series prediction." IEEE Transactions on Knowledge and Data Engineering 35.6 (2022): 5837-5850. (Year: 2022).*

Guo, Dan, et al. "Iterative context-aware graph inference for visual dialog." Proceedings of the IEEE/CVF Conference on Computer Vision and Pattern Recognition. 2020. (Year: 2020).*

* cited by examiner

100

(a) The original NODE architecture (b) Our proposed ACE-NODE architecture (a)           (b)

FIG. 8

Algorithm 1: How to train the dual co-evolving NODEs

Input: Training data $D_{train}$, Validating data $D_{dual}$,
Maximum iteration number *max_iter*

1 Initialize $\theta_f$, $\theta_g$, and other parameters $\theta_{others}$ if any, e.g., the parameters of the feature extractor and the classifier;
2 $k \leftarrow 0$;
3 while $k <$ *max_iter* do
4     Train $\theta_f$ and $\theta_{others}$ with $\nabla_{\theta_f} L_h$ and $\nabla_{\theta_{others}} L_h$;
5     Train $\theta_g$ with $\nabla_{\theta_g} L_a$;
6     Validate and update the best parameters, $\theta_f^*$, $\theta_g^*$ and $\theta_{others}^*$, with $D_{dual}$;
7     $k \leftarrow k + 1$;
8 return $\theta_f^*$, $\theta_g^*$ and $\theta_{others}^*$;

FIG. 9

| Layer | Design | Input Size | Output Size |
|---|---|---|---|
| 1 | ReLU(GroupNorm) | 6 × 6 × 64 | 6 × 6 × 64 |
| 2 | ReLU(GroupNorm(Conv2d)) | 6 × 6 × 64 | 6 × 6 × 64 |
| 3 | GroupNorm(Conv2d) | 6 × 6 × 64 | 6 × 6 × 64 |

(a)

| Method | Accuracy | #Params |
|---|---|---|
| ResNet | 99.65 ± 0.03 | 0.58M |
| RKNet | 98.66 ± 0.57 | 0.21M |
| ODE-Net | 99.61 ± 0.05 | 0.21M |
| Augmented-ODE-Net | 99.66 ± 0.04 | 0.22M |
| ACE-ODE-Net | 99.68 ± 0.03 | 0.28M |

(b)

| Method | Accuracy | #Params |
|---|---|---|
| ResNet | 95.78 ± 0.05 | 0.58M |
| RKNet | 91.00 ± 0.71 | 0.21M |
| ODE-Net | 95.54 ± 0.13 | 0.21M |
| Augmented-ODE-Net | 95.80 ± 0.08 | 0.22M |
| ACE-ODE-Net | 96.01 ± 0.10 | 0.32M |

| Method | Accuracy | #Params |
|---|---|---|
| ResNet | 86.36 ± 0.41 | 0.58M |
| RKNet | 84.81 ± 0.23 | 0.21M |
| ODE-Net | 85.35 ± 0.62 | 0.21M |
| Augmented-ODE-Net | 85.59 ± 0.09 | 0.22M |
| ACE-ODE-Net | 85.99 ± 0.12 | 0.36M |

(a)

| Method | CIFAR10 |
|---|---|
| ODE-Net | 0.5216 ± 0.003 |
| Augmented-ODE-Net | 0.5220 ± 0.005 |
| ACE-ODE-Net | 0.5406 ± 0.002 |

(b)

| Method | MSE | NegLL |
|---|---|---|
| Neural-ODE-VAE | 0.96 ± 0.11 | 1.46 ± 0.10 |
| Neural-ODE-VAE-Mask | 0.83 ± 0.10 | 1.36 ± 0.05 |
| Sequential VAE | 0.83 ± 0.07 | 1.37 ± 0.06 |
| GRU-Simple | 0.75 ± 0.12 | 1.23 ± 0.10 |
| GRU-D | 0.53 ± 0.06 | 0.99 ± 0.07 |
| T-LSTM | 0.59 ± 0.11 | 1.67 ± 0.50 |
| GRU-ODE-Bayes | 0.42 ± 0.04 | 0.98 ± 0.06 |
| Augmented-GRU-ODE-Bayes | 0.44 ± 0.03 | 1.01 ± 0.02 |
| ACE-GRU-ODE-Bayes | 0.38 ± 0.03 | 0.94 ± 0.05 |

| Method | AUC |
| --- | --- |
| RNN $\Delta_t$ | 0.787 ± 0.014 |
| RNN-Impute | 0.764 ± 0.016 |
| RNN-Decay | 0.807 ± 0.003 |
| RNN GRU-D | 0.818 ± 0.008 |
| RNN-VAE | 0.515 ± 0.040 |
| Latent-ODE (RNN Enc.) | 0.781 ± 0.018 |
| ODE-RNN | 0.833 ± 0.009 |
| Latent-ODE + Poisson | 0.826 ± 0.007 |
| Latent-ODE (ODE Enc.) | 0.829 ± 0.004 |
| Augmented-Latent-ODE (ODE Enc.) | 0.851 ± 0.002 |
| ACE-Latent-ODE (ODE Enc.) | 0.853 ± 0.003 |

(a)

| Method | Interp. (x$10^{-3}$) | Extrap. (x$10^{-3}$) |
| --- | --- | --- |
| RNN-VAE | 5.930 ± 0.249 | 3.055 ± 0.145 |
| Latent-ODE (RNN enc.) | 3.907 ± 0.252 | 3.162 ± 0.052 |
| Latent-ODE (ODE enc.) | 2.118 ± 0.271 | 2.231 ± 0.029 |
| Latent-ODE + Poisson | 2.789 ± 0.771 | 2.208 ± 0.050 |
| Augmented-Latent-ODE (ODE enc.) | 2.697 ± 0.771 | 2.042 ± 0.061 |
| ACE-Latent-ODE (ODE enc.) | 2.560 ± 0.08 | 2.025 ± 0.028 |

| Method | AUC |
| --- | --- |
| RNN $\Delta_t$ | 0.797 ± 0.003 |
| RNN-Impute | 0.795 ± 0.008 |
| RNN-Decay | 0.800 ± 0.010 |
| RNN GRU-D | 0.806 ± 0.007 |
| RNN-VAE | 0.343 ± 0.040 |
| Latent-ODE (RNN Enc.) | 0.835 ± 0.010 |
| ODE-RNN | 0.829 ± 0.016 |
| Latent-ODE (ODE Enc.) | 0.846 ± 0.013 |
| Augmented-ODE (ODE Enc.) | 0.811 ± 0.031 |
| ACE-Latent-ODE (ODE Enc.) | 0.859 ± 0.011 |

(a)

| Method | CIFAR10 | SVHN | MNIST |
| --- | --- | --- | --- |
| ACE-ODE-Net (Small) | 85.99 (0.36M) | 96.01(0.32M) | 99.68(0.28M) |
| ACE-ODE-Net (Large) | 88.12(1.27M) | 96.12(1.42M) | 99.58(1.27M) |

(b)

| Method | PhysioNet(AUC) | Human Activity(AUC) |
| --- | --- | --- |
| FC-ACE-ODE-Net | 0.793 | 0.569 |
| Fixed-ACE-ODE-Net | 0.838 | 0.551 |
| ACE-ODE-Net | 0.853 | 0.859 |

(c)

APPARATUS AND METHOD FOR ARTIFICIAL INTELLIGENCE NEURAL NETWORK BASED ON CO-EVOLVING NEURAL ORDINARY DIFFERENTIAL EQUATIONS

CROSS-REFERENCE TO RELATED APPLICATION

This application claims priority to Korean Patent Application No. 10-2021-0181699 (filed on Dec. 17, 2021), which is hereby incorporated by reference in its entirety.

BACKGROUND

The present disclosure relates to artificial intelligence neural network construction technology, and more particularly, to an apparatus and method for an artificial intelligence neural network based on co-evolving neural ordinary differential equations (NODEs) that implement attentive co-evolving dual NODEs by constructing a neural ODE for machine learning tasks and a neural ODE for providing attention based on the neural ODE.

It is known that the residual connection, denoted $h(t+1) = h(t)+f(h(t))$, where $h(t)$ means a hidden vector (hidden layer) at layer (or time) t, is identical to the explicit Euler method to solve ODEs. In this regard, the neural ordinary differential equations (NODEs) may generalize the residual connection using a continuous time variable t.

That is, t in the NODEs may be any real number, whereas t in the existing residual network should be to a non-negative integer. Thus, the NODEs may show their efficacy in many different tasks. For example, the NODEs may not only show better accuracy than the related art, but may also have a smaller number of parameters in comparison with existing neural networks.

For further improvement, many researchers have proposed enhancements for NODEs ranging from ODE state augmentation to new regularization specific to NODEs. The ODE state augmentation has been proposed to overcome the homeomorphic characteristic of NODEs, and various regularization concepts have been proposed to learn straight-line ODEs that are considered to be easy to solve.

However, there is no existing work to integrate the concept of attention with NODEs.

RELATED ART DOCUMENT

Patent Document

Korean Patent Laid-Open Publication No. 10-2021-0031197 (Mar. 19, 2021).

SUMMARY

An embodiment of the present disclosure provides an apparatus and method for an artificial intelligence neural network based on co-evolving neural ordinary differential equations (NODEs) that implement attentive dual co-evolving NODEs by constructing a neural ODE for a machine learning task and a neural ODE for providing attention based on the neural ODE.

According to embodiments of the present disclosure, an apparatus for an artificial intelligence neural network based on co-evolving neural ordinary differential equations (NODEs) includes a main NODE module configured to provide a downstream machine learning task, and an attention NODE module configured to receive the downstream machine learning task and provide attention to the main NODE module, in which the main NODE module and the attention NODE module may influence each other over time so that the main NODE module outputs a multivariate time-series value at a given time for an input sample x.

The apparatus may further include a feature extraction module configured to extract a feature for the input sample x to generate an initial feature vector at an initial time, and provide the initial feature vector to the main NODE module.

The apparatus may further include an initial attention generating module configured to receive the initial feature vector to generate initial attention, and provide the initial attention to the attention NODE module to support calculation of a multivariate time-series value at a next time.

The main NODE module may perform integration of an ordinary differential equation (ODE) function with for adjoint times, and the ODE function may receive 1) the multivariate time-series value and 2) the attention at the given time.

The attention NODE module may performs element-wise multiplication between the multivariate time-series value and a sigmoid activation function of a time-evolving matrix as the ODE function.

The attention NODE module may perform integration of an attention generation function for the adjoint times, and the attention generation function may receive 1) a time evolution matrix representing a logit value of the attention and 2) the multivariate time-series value is input at the given time.

The apparatus may further include a classification module configured to receive the multivariate time-series value at the given time and performs prediction on the input sample.

According to embodiments of the present disclosure, a method for an artificial intelligence neural network based on co-evolving neural ordinary differential equations (NODEs) includes providing, by a main NODE module, a downstream machine learning task, and receiving, by an attention NODE module, the downstream machine learning task and providing attention to the main NODE module, in which the main NODE module and the attention NODE module may influence each other over time so that the main NODE module outputs a multivariate time-series value at a given time for an input sample x.

The method may further extracting, by a feature extraction module, a feature for the input sample x to generate an initial feature vector at an initial time, and providing the initial feature vector to the main NODE module.

The method may further include receiving, by an initial attention generating module, the initial feature vector to generate initial attention, and providing the initial attention to the attention NODE module to support calculation of a multivariate time-series value at a next time.

The main NODE module may perform integration of an ordinary differential equation (ODE) function with for adjoint times, and the ODE function may receive 1) the multivariate time-series value and 2) the attention at the given time.

The method may further include receiving, by a classification module, the multivariate time-series value at the given time and performing prediction on the input sample.

The disclosed technology may have the following effects. However, since a specific embodiment is not construed as including all of the following effects or only the following effects, it should not be understood that the scope of the disclosed technology is limited to the specific embodiment.

An apparatus and method for an artificial intelligence neural network based on co-evolving neural ordinary differential equations (NODEs) according to the present disclosure may implement attentive dual co-evolving NODEs by constructing a neural ODE for machine learning tasks and a neural ODE for providing attention based on the neural ODE.

BRIEF DESCRIPTION OF THE DRAWINGS

FIG. 8 is a diagram for describing a training algorithm according to the present disclosure.

FIGS. 9 to 12 are diagrams for describing experimental results related to the present disclosure.

DETAILED DESCRIPTION

Figure 1:
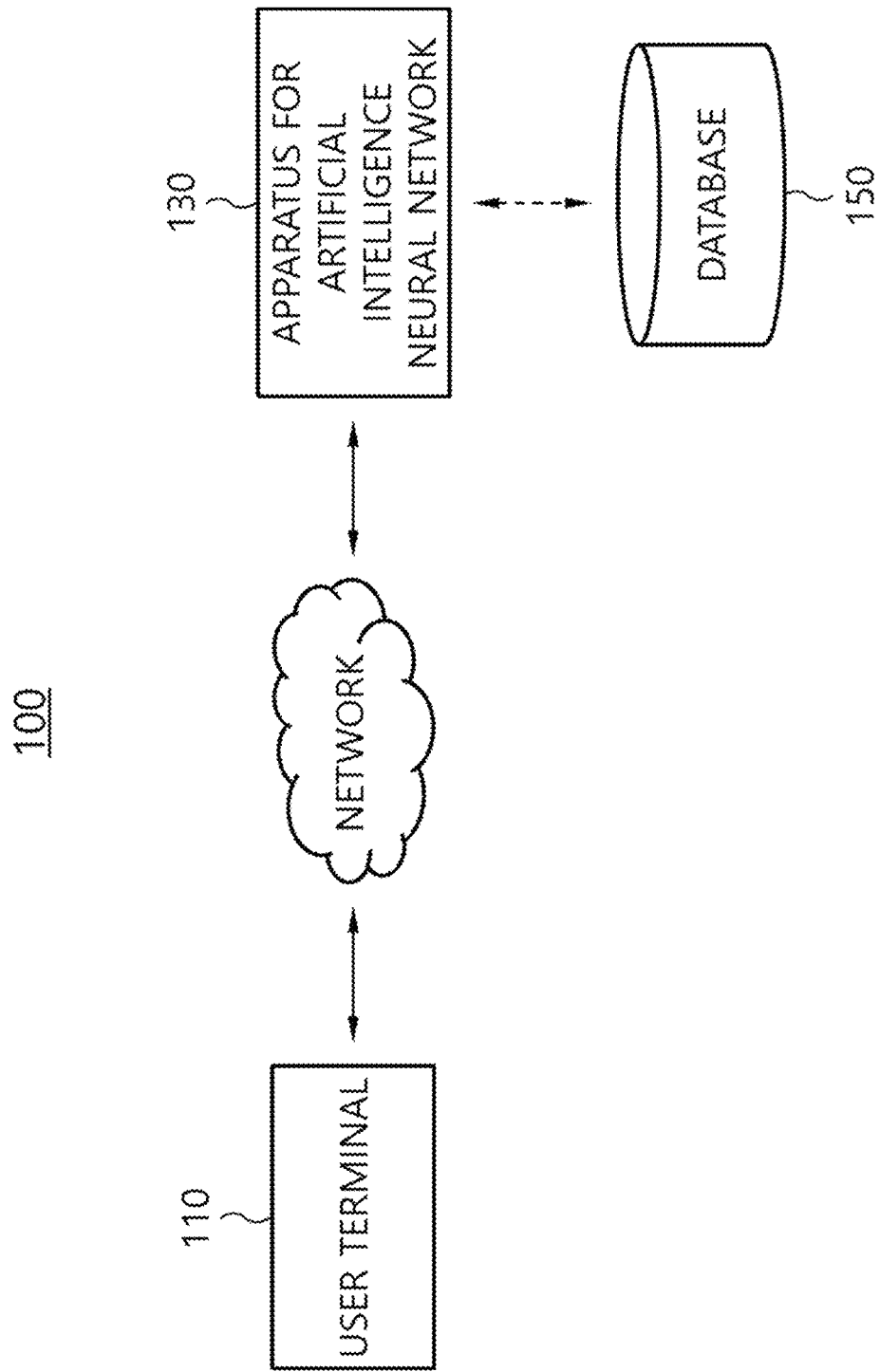
FIG. 1 is a diagram for describing a system for an artificial intelligence neural network according to the present disclosure.

Since the description of the present disclosure is merely an embodiment for structural or functional explanation, the scope of the present disclosure should not be construed as being limited by the embodiments described in the text. That is, since the embodiments may be variously modified and may have various forms, the scope of the present disclosure should be construed as including equivalents capable of realizing the technical idea. In addition, a specific embodiment is not construed as including all the objects or effects presented in the present disclosure or only the effects, and therefore the scope of the present disclosure should not be understood as being limited thereto.

On the other hand, the meaning of the terms described in the present application should be understood as follows.

Terms such as "first" and "second" are intended to distinguish one component from another component, and the scope of the present disclosure should not be limited by these terms. For example, a first component may be named a second component and the second component may also be similarly named the first component.

It is to be understood that when one element is referred to as being "connected to" another element, it may be connected directly to or coupled directly to another element or be connected to another element, having the other element intervening therebetween. On the other hand, it is to be understood that when one element is referred to as being "connected directly to" another element, it may be connected to or coupled to another element without the other element intervening therebetween. Meanwhile, other expressions describing a relationship between components, that is, "between," "directly between," "neighboring to," "directly neighboring to," and the like, should be similarly interpreted.

It should be understood that the singular expression include the plural expression unless the context clearly indicates otherwise, and it will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof. In each step, an identification code (for example, a, b, c, and the like) is used for convenience of description, and the identification code does not describe the order of each step, and each step may be different from the specified order unless the context clearly indicates a particular order. That is, the respective steps may be performed in the same sequence as the described sequence, be performed at substantially the same time, or be performed in an opposite sequence to the described sequence.

The present disclosure may be embodied as computer readable code on a computer-readable recording medium, and the computer-readable recording medium includes all types of recording devices in which data may be read by a computer system. An example of the computer readable recording medium may include a read only memory (ROM), a random access memory (RAM), a compact disk read only memory (CD-ROM), a magnetic tape, a floppy disk, an optical data storage, or the like. In addition, the computer readable recording medium may be distributed in computer systems connected to each other through a network, such that the computer readable codes may be stored in a distributed scheme and executed.

Unless defined otherwise, all the terms used herein including technical and scientific terms have the same meaning as meanings generally understood by those skilled in the art to which the present disclosure pertains. It should be understood that the terms defined by the dictionary are identical with the meanings within the context of the related art, and they should not be ideally or excessively formally defined unless the context clearly dictates otherwise.

First, a neural ODE (NODE) will be described.

The NODEs may solve an integral problem of calculating $h(t_1)$ from $h(t_0)$, expressed as in Equation 1 below.

$$h(t_1) = h(t_0) + \int_{t_0}^{t_1} f(h(t), t; \theta_f) dt \qquad \text{[Equation 1]}$$

Here, $f(h(t), t; \theta_f)$ is an ODE function, and may correspond to a neural network to approximate to a time-derivative of h, that is $$\dot{h} \stackrel{del}{=} \frac{dh(t)}{dt}.$$

To solve the integral problem, NODEs may utilize the existing ODE solvers such as the explicit Euler method and the Dormand-Prince (DOPRI) method.

In general, the ODE solvers may discretize a time variable t and convert the integral into a multi-step addition. For example, the explicit Euler method may be expressed as in Equation 2 below in a specific step.

$$h(t+s) = h(t) + s \cdot f(h(t), t; \theta_f) \qquad \text{[Equation 2]}$$

Here, s is generally less than 1 and is a predetermined step size of the explicit Euler method. The above Equation 2 may be the same as a residual connection when s=1.

The DOPRI method may use a much more complex method to update h(t+s) from h(t), and may dynamically adjust the step size s. However, these ODE solvers may provide unexpected numerical instability. For example, the DOPRI method may cause an underflow error by continuously reducing the step size s. Several methods have been proposed to avoid these unexpected problems.

One distinguishing feature of the NODEs is that the NODEs may calculate a gradient of loss with respect to the NODE parameters, and the gradient of loss may be expressed as $$\nabla_{\theta_f} L = \frac{dL}{d\theta_f}$$

when L is a task-dependent loss function and may be calculated by reverse-mode integration in which space complexity is O(1) The above method may correspond to an adjoint sensitivity method.

FIG. 5A may represent a general architecture of the NODEs. Assuming a downstream classification task in the architecture, there may be a feature extraction layer providing $h(t_0)$ (in this case, $t_0=0$) and $h(t_1)$ (in this case, $t_1=1$) calculated by the above method. Then, the existing classification layer may output a prediction for an input x.

Figure 6:
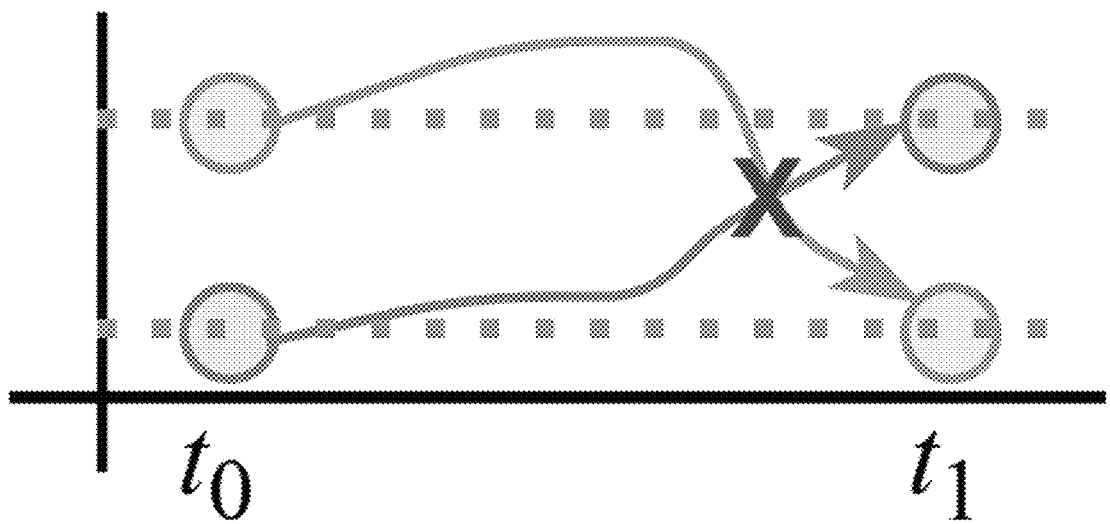
FIG. 6 is a diagram for describing homeomorphic mapping according to the present disclosure.

$\phi_t : \mathbb{R}^{dim(h(t_0))} \to \mathbb{R}^{dim(h(t_1))}$ may be defined as a mapping function from $t_0$ to $t_1$ created by the NODEs after solving the integral problem. $\phi_t$ may correspond to homeomorphic mapping, and $\phi_t$ is continuous and bijective, and $\phi_t^{-1}$ may be continuous for all $t \in [0,T]$. In this case, T is the last time point in the time domain. From this feature, the following proposition may be derived. That is, since a topology of an input space of $\phi_t$ is preserved in an output space, trajectories intersecting each other may not be expressed by NODEs (see FIG. 6).

The NODEs may perform machine learning tasks while maintaining topology, and may improve robustness of representation learning against adversarial attacks. However, at the same time, the expression learning ability of the NODEs may not be as high as expected for the same reason, and methods have been proposed to overcome the homeomorphic mapping limitations of the NODEs. In this case, the method may correspond to an augmented NODE. The augmentation method brings $h(t_0)$ into a higher dimensional space by appending several zeros. That is, it may be expressed as h(t0)⊕0, where ⊕ is concatenation and 0 is a zero vector in certain dimensionality.

Hereinafter, the attention will be described.

Attention to capturing useful information may correspond to one of the most successful concepts of deep learning. The attention is initially studied for natural language processing and computer vision, and has rapidly spread to other fields. The attention mechanism may be easily described through a human visual perception system that focuses on the optional part of the input while ignoring the irrelevant part. There may be several different types of attention and its applications.

However, since the NODE is a relatively new paradigm for neural network design and the method of integrating attention is not simple, the NODE has not yet been actively studied. ETN-ODE may use attention in the feature extraction layer before the NODE layer, and does not introduce a new NODE model that is internally combined with attention. In other words, the ETN-ODE may use attention to derive h(0) in the feature extraction layer and then evolve h(0) using the standard NODE layer. In the ETN-ODE, the layer including the attention may be a feature extraction layer. In that sense, it may not be sufficient to say that ETN-NODE is an attention-based NODE model.

However, in the NODE, h(t) may correspond to a hidden vector at time t. To help with a downstream task with attention, a(t) meaning attention at time t may be defined. Then, with the help of a(t), h(t+s) may be derived from h(t). One more thing may be that they naturally co-evolve rather than being independent from each other. Attentive co-evolving neural ordinary differential equations (ACE-NODE) according to the present disclosure may correspond to this concept.

Hereinafter, an apparatus and method for an artificial intelligence neural network according to the present disclosure will be described in more detail with reference to FIGS. 1 to 8.

FIG. 1 is a diagram for describing a system for an artificial intelligence neural network according to the present disclosure.

Referring to FIG. 1, a system 100 for an artificial intelligence neural network may be implemented to execute a method for an artificial intelligence neural network based on co-evolving neural ordinary differential equations (NODEs) according to the present disclosure. To this end, the system 100 for an artificial intelligence neural network may include a user terminal 110, an apparatus 130 for an artificial intelligence neural network, and a database 150.

The user terminal 110 may correspond to a terminal device operated by a user. For example, a user may process an operation related to data generation and learning through the user terminal 110. In an embodiment of the present disclosure, a user may be understood as one or more users, and a plurality of users may be divided into one or more user groups.

In addition, the user terminal 110 may correspond to a computing device that operates in conjuction with the apparatus 130 for an artificial intelligence neural network as one apparatus constituting the system 100 for an artificial intelligence neural network. For example, the user terminal 110 may be implemented as a smart phone, a notebook computer, or a computer that is connected to the apparatus for an artificial intelligence neural network 130 and is not necessarily limited thereto, and may be implemented as various devices including a tablet PC, etc. In addition, the user terminal 110 may install and execute a dedicated program or application (or app) for interworking with the apparatus 130 for an artificial intelligence neural network.

The apparatus 130 for an artificial intelligence neural network may be implemented as a server corresponding to a computer or program that executes a method for an artificial intelligence neural network based on co-evolving neural ordinary differential equations according to the present disclosure. In addition, the apparatus 130 for an artificial intelligence neural network may be connected to the user terminal 110 by a wired network or a wireless network such as Bluetooth, WiFi, and LTE, and may transmit/receive data to and from the user terminal 110 through the network. In addition, the apparatus 130 for an artificial intelligence neural network may be implemented to operate in connection with an independent external system (not illustrated in FIG. 1) in order to perform a related operation.

The database 150 may correspond to a storage device for storing various types of information required in an operation process of the apparatus 130 for an artificial intelligence neural network. For example, the database 150 may store information on training data used in a learning process, and may store information on a model or a training algorithm for learning, but is not necessarily limited thereto, and the apparatus 130 for an artificial intelligence neural network may store information collected or processed in various forms in the process of performing the method for an artificial intelligence neural network based on co-evolving neural ordinary differential equations according to the present disclosure.

Meanwhile, in FIG. 1, the database 150 is shown as a device independent of the apparatus 130 for an artificial intelligence neural network, but is not necessarily limited thereto, and may be implemented to be included in the apparatus 130 for an artificial intelligence neural network as a logical storage device.

Figure 2:
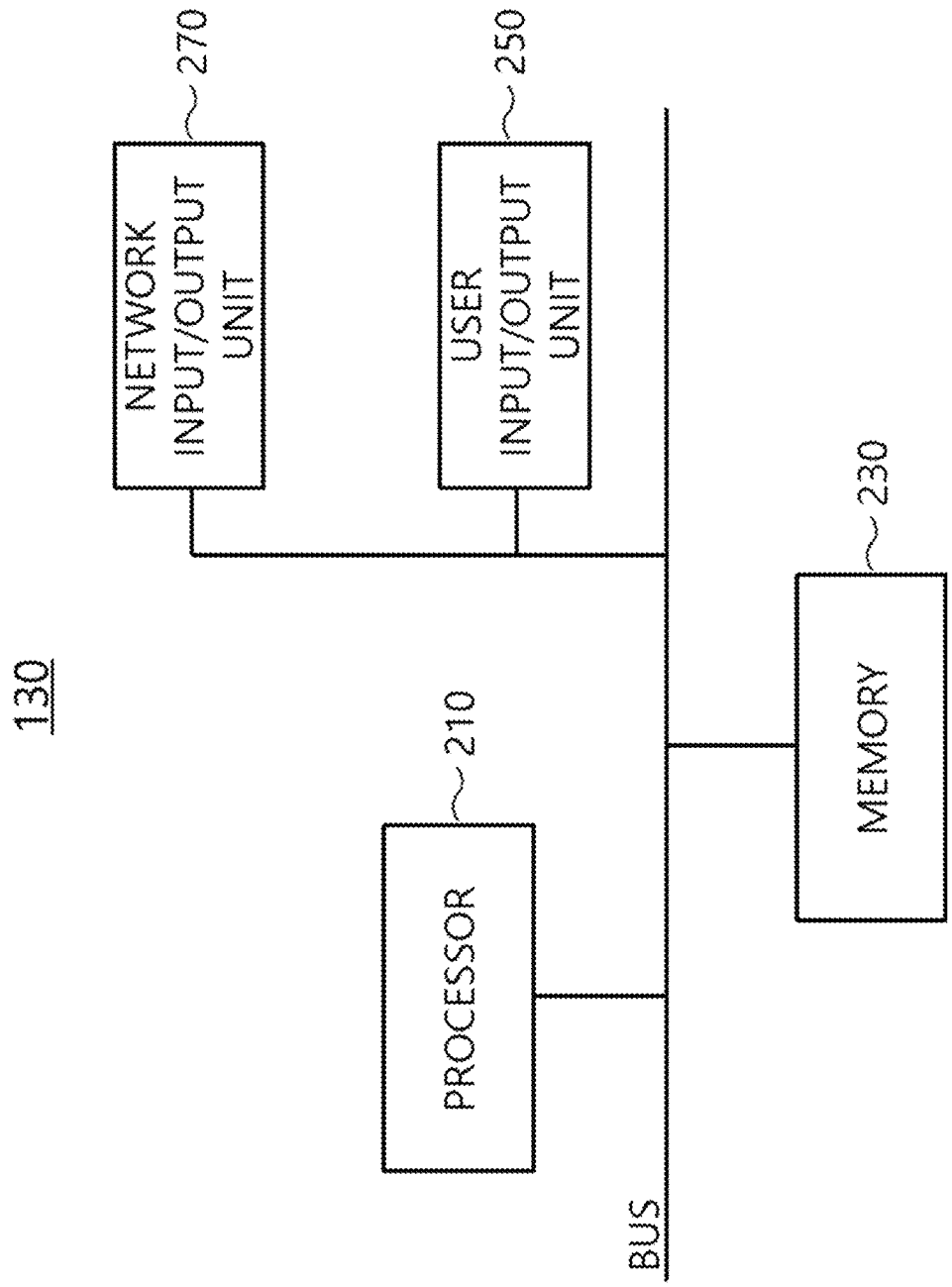
FIG. 2 is a diagram for describing an apparatus for an artificial intelligence neural network according to the present disclosure.

FIG. 2 is a diagram for describing a system configuration of an apparatus for an artificial intelligence neural network according to the present disclosure.

Referring to FIG. 2, the apparatus 130 for an artificial intelligence neural network may include a processor 210, a memory 230, a user input/output unit 250, and a network input/output unit 270.

The processor 210 may execute an artificial intelligence neural network procedure based on co-evolving neural ordinary differential equations according to the present disclosure, and schedule a synchronization time between a volatile memory and a non-volatile memory in the memory 230. The processor 210 may control the overall operation of the apparatus 130 for an artificial intelligence neural network, and may be electrically connected to the memory 230, the user input/output unit 250, and the network input/output unit 270 to control the data flow therebetween. The processor 210 may be implemented as a central processing unit (CPU) of the apparatus 130 for an artificial intelligence neural network.

The memory 230 is implemented as a non-volatile memory, such as a solid state disk (SSD) or a hard disk drive (HDD), and may include an auxiliary memory device used to store overall data required for the apparatus 130 for an artificial intelligence neural network, and may include a main storage device implemented as a volatile memory such as random access memory (RAM). In addition, the memory 230 may store a set of instructions for executing the method for an artificial intelligence neural network based on co-evolving neural ordinary differential equations according to the present disclosure by being executed by the electrically connected processor 210.

The user input/output unit 250 includes an environment for receiving a user input and an environment for outputting specific information to a user, and may include, for example, an input device including an adapter such as a touch pad, a touch screen, an on-screen keyboard, or a pointing device and an output device including an adapter such as a monitor or a touch screen. In an embodiment, the user input/output unit 250 may correspond to a computing device accessed through a remote connection, and in this case, the apparatus 130 for an artificial intelligence neural network may be performed as an independent server.

The network input/output unit 270 may provide a communication environment to be connected to the user terminal 110 through a network, and may include, for example, an adapter for communications such as a local area network (LAN), a metropolitan area network (MAN), a wide area network (WAN), and a value added network (VAN). Also, the network input/output unit 270 may be implemented to provide a short-distance communication function such as WiFi or Bluetooth or a wireless communication function of 4G or higher for wireless data transmission.

Figure 3:
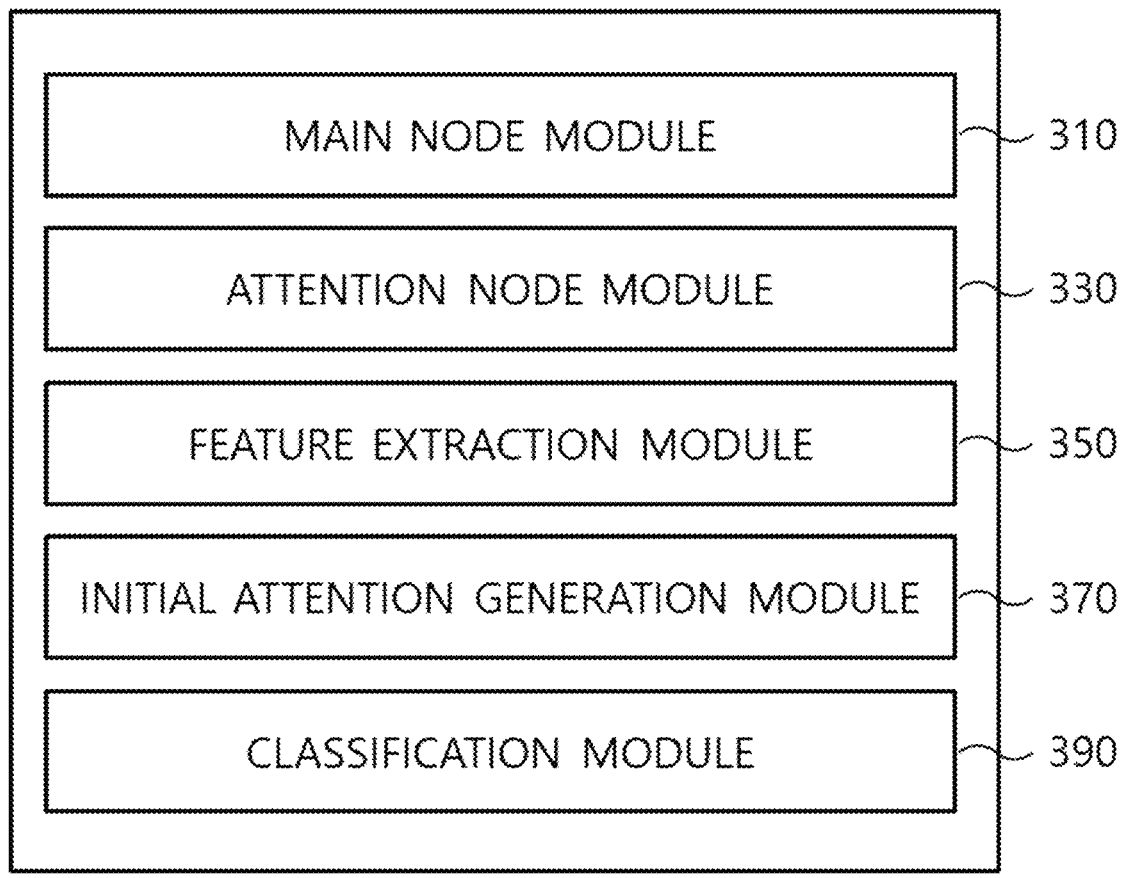
FIG. 3 is a diagram for describing a functional configuration of the apparatus for an artificial intelligence neural network according to the present disclosure.

FIG. 3 is a diagram for describing a functional configuration of the apparatus for an artificial intelligence neural network according to the present disclosure.

Referring to FIG. 3, the apparatus 130 for an artificial intelligence neural network may be implemented including an attentive neural ODE (ODE). As a configuration for this, the apparatus 130 for an artificial intelligence neural network may include a main NODE module 310 and an attention NODE module 330. The main NODE module 310 may perform an operation of providing a downstream machine learning task, and the attention NODE module 330 may receive a downstream machine learning task and provide attention to the main NODE module 310. Here, the main NODE module 310 and the attention NODE module 330 may influence each other over time so that the main NODE module 310 outputs a multivariate time-series value at a given time for an input sample x.

In one embodiment, the main NODE module 310 performs integration of an ordinary differential equation (ODE) function for adjoint times, and the ODE function may receive 1) the multivariate time-series value and 2) the attention at a given time.

In an embodiment, the attention NODE module 330 may perform element-wise multiplication between the multivariate time-series value and a sigmoid activation function of a time-evolving matrix as the ODE function.

In an embodiment, the attention NODE module 330 may perform integration of the attention generation function for the adjoint times, and the attention generation function may receive 1) the time-evolving matrix representing a logit value of attention and 2) the multivariate time-series value at a given time.

In an embodiment, the apparatus 130 for an artificial intelligence neural network may further includes at least one of a feature extraction module 350, an initial attention generation module 370, a classification module 390, and a control module (not illustrated in FIG. 3). More specifically, the feature extraction module 350 may perform an operation of extracting a feature for the input sample x to generate an initial feature vector at an initial time, and providing the initial feature vector to the main NODE module 310. The initial attention generation module 370 may perform an operation of receiving the initial feature vector to generate the initial attention, and providing the initial attention to the attention NODE module 330 to support a calculation of multivariate time-series values at the next time. Also, the classification module 390 may receive the multivariate time-series value at a given time and perform an operation of performing prediction for the input sample.

Figure 5:
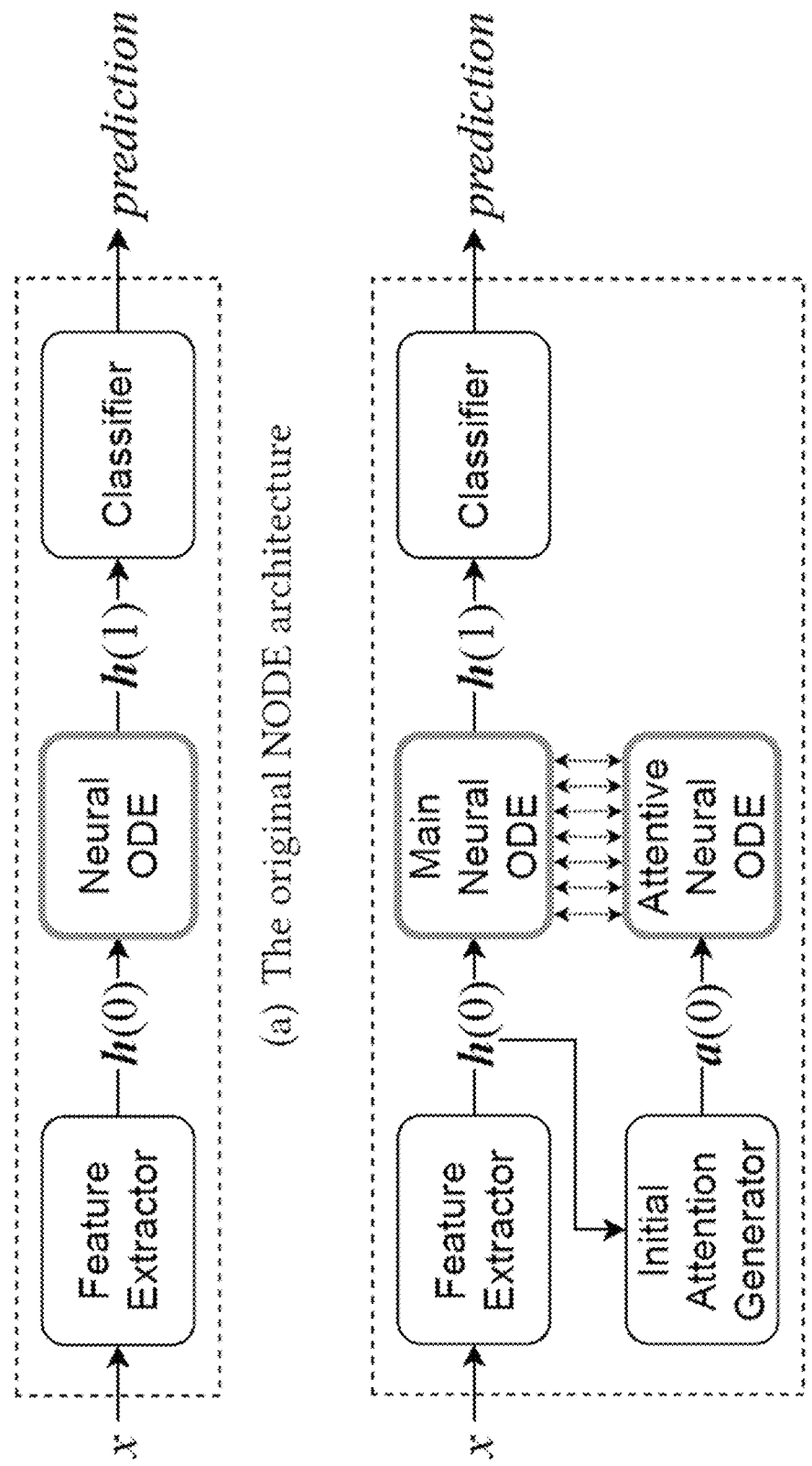
FIG. 5 is a diagram for describing architecture according to the present disclosure.

Meanwhile, referring to FIG. 5, the apparatus 130 for an artificial intelligence neural network may build a new model of attentive dual co-evolving NODE (ACE-NODE) and execute a training algorithm for this. In FIG. 5B, one NODE is for explaining a time-evolving process of a hidden vector represented by h(t), and the other is for an attention process that evolves over time represented by a(t). That is, in the model, h(t) and a(t) may evolve together to perform downstream machine learning tasks (eg, image classification, time-series prediction, etc.).

In FIG. 5, the design for the present disclosure may be based on original NODE architecture including a feature extractor and a classifier. For the sake of simplicity without losing generality, we may assume a classification in that architecture. After generating the initial attention represented by a(0) the present disclosure may include a dual co-evolving NODE for the present disclosure, which may be more sophisticated than the original design. That is, as a result, the training algorithm for this may also become more complex.

In the case of the present disclosure, the attention generated by a(t) may be classified into two types: That is, i) pairwise attention and ii) elementwise attention. The former often occurs in time-series prediction and the latter may occur in image classification. In the case of the image classification, h(t) may mean a continuous-time feature map. For example, ODE-Net following the architecture of FIG. 5A may define a NODE layer using an image convolution operation. Therefore, h(t) may mean a convolutional feature map for all t. In this case, the attention NODE a(t) according to the present disclosure generate the elementwise attention, which may be elementwise-multiplied by h(t).

Hereinafter, the attentive neural ODE will be described.

Here, the definition of the attention and the co-evolving dual NODEs training method according to the present disclosure will be described. FIG. 5B illustrates general architecture according to the present disclosure.

An initial attention generation function q is a(0)=q(h(0); $\theta_q$). Thereafter, the dual co-evolving NODE (NODE) according to the present disclosure may be disclosed. That is, h(t) and a(t) may evolve together over time on the framework according to the present disclosure, and may influence each other to generate a reliable hidden representation h(1) for the input sample x. In addition, there may be a classifier that processes h(1) and generates prediction for x.

In an embodiment, a pairwise attention definition according to the present disclosure may be described by the co-evolving dual NODEs expressed as Equation 3 below.

$$h(t_1) = h(t_0) + \int_{t_0}^{t_1} f(h(t), a(t), t; \theta_f) dt$$

$$a(t_1) = a(t_0) + \int_{t_0}^{t_1} g(a(t), h(t), t; \theta_g) dt \quad [\text{Equation 3}]$$

Here, $a(t) = \mathbb{R}^{dim(h(t)) \times dim(h(t))}$. That is, a(t) is a time-evolving matrix representing the logit value of the attention from an $i^{th}$ dimension to a $j^{th}$ dimension of h(t) for all i and j pairs. Meanwhile, softmax activation may be used to convert the logit into the attention (see Equation 4 below).

Figure 7:
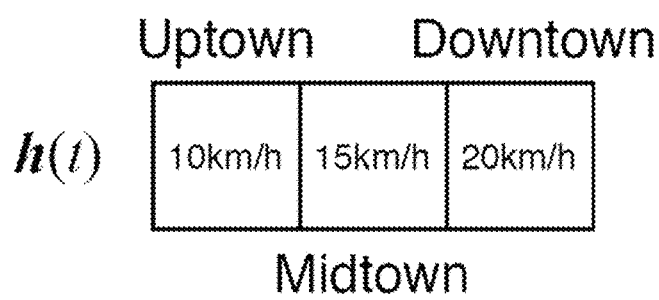
FIG. 7 is a diagram for describing an embodiment of an ODE state and pairwise attention according to the present disclosure.

Such setups may frequently appear in multivariate time-series forecasting, which h(t) may represent a snapshot of the multivariate time-series at time t. For example, FIG. 7 may appear an example of ODE describing traffic conditions in three areas of New York. Each element of h(t) of time t in may include an average vehicle speed in each region Also, FIG. 7 illustrates an attention matrix in which each region has a strong attention to itself and a neighboring region.

Therefore, in the case of the present disclosure, the attention may be adopted for h(t) at the beginning of f as shown in Equation 4 below $$f(h(t), a(t), t; \theta_f) = f'(h'(t), t; \theta_f)$$

$$h'^{(t)} = h(t) \sigma(a(t))^T \quad [\text{Equation 4}]$$

Here, σ is softmax activation, and "T" indicates transpose. That is, in the case of the present disclosure, the ODE function f(h(t), a(t), t; $\theta_f$) may be redefined based on $h'^{(t)}$. In particular, dim(h'(t))=dim(h(t)). Other ODE functions may also be defined as g and g'(h'(t), t; $\theta_g$).

The definitions of f' and g' may be different for datasets and tasks. Therefore, a general form will be described here, and a specific design will be described later in the experimental evaluation section. However, well-defined ODE functions in other tasks may be adopted for f'. For example, the GRU-ODE may be a continuous generalization of a gated recurrent unit (GRU). An author of the GRU-ODE has demonstrated that GRU may be theoretically modeled by a time-dependent ODE (ODE). Thus, the ODE function f' of the present disclosure may be adopted for the ODE function f of the GRU-ODE that models the continuous-time GRU, and thus, it may be an attentive GRU-ODE (GRU-ODE) with additional additive NODE of the present disclosure.

Also, the ODE function g' needs to be designed. However, as a result of finding that each task or each data has its own optimized attention mechanism, the specific design of g' of for each task or each data will be described in the experimental evaluation part.

In an embodiment, an elementwise attention definition according to the present disclosure may be described by the above Equation 3 including another definition of a(t)= $\mathbb{R}^{dim(h(r))}$. The corresponding setup may frequently appear in the existing convolutional neural networks, and h(t) may represent a feature map created by the convolution.

In the case of the present disclosure, the elementwise multiplication expressed by Equation 5 below may be performed in order to apply the attention to the feature map.

$$f(h(t), a(t), t; \theta_f) = f'(h''(t), t; \theta_f)$$

$$h''(t) = h(t) \odot \phi(a(t)) \quad [\text{Equation 5}]$$

Here, ⊙ is elementwise multiplication since the elementwise attention value is included in φ(a(t)). In this case, φ is sigmoid activation. Other ODE functions g may use h"(t).

The definition may correspond to an attention mechanism in image processing that focuses on a sub-region of an image, such as object detection and image classification. Using h"(t), the ODE function f(h(t), a(t), t; $\theta_f$) may be redefined as f'(h"(t), t; $\theta_f$). In experiments on the present disclosure, well-defined ODE functions may be adopted in other tasks for f'. Since each task or each data has its own optimized attention design, the design for g is described in the experimental evaluation part.

Hereinafter, the training algorithm according to the present disclosure will be described.

Sophisticated training algorithms may be required to learn the dual co-evolving NODE. Here, a method for training a model according to the present disclosure will be described.

Several studies have reported that numerical instabilities (for example, underflow errors in adaptive step size ODE solvers) appear when training the NODEs. Accordingly, several advanced regularization concepts (specialized in improving the numerical stability of NODEs), that is, i) kinetic energy regularization, ii) high-order derivative regularization, and iii) step size regularization of the DOPRI, have been proposed.

However, these regularization methods allow the NODE to train a straight line path from $t_0$ to $t_1$, which may not be suitable for a(t). For example, in the architecture of FIG. 5, the downstream classification task may only need h(1), and thus, it may be reasonable to apply a straight line for h(t). However, the trajectory of the attention may not always correspond to a straight line. Since the attention value may change with time, an existing regularization method such as $L^1$ or $L^2$ regularization may be considered.

h(t) Since we adopt the design of the existing NODEs for h(t) and extend it to dual co-evolving NODEs by adding a(t), we reuse its original setup for h(t). In this case, the loss function may correspond to $L_h$. For example, $L_h$ may be composed of a task-specific loss denoted by $L_{task}$, and an appropriate regularization term. For experiments on the present disclosure, the original experimental setup can be strictly applied to confirm the effect of adding an attention mechanism without $L_h$ being modified. Then, in order to train the attention mechanism according to the present disclosure, the loss function expressed as Equation 6 below may be applied $$L_a \mathbb{R} L_{task} + \lambda \|\theta_g\|_{1 \text{ or } 2} \quad \text{[Equation 6]}$$

Here, $L_{task}$ is a task-specific loss function (for example, cross-entropy loss), and $\lambda > 0$ is a coefficient of regularization.

The training algorithm is illustrated in FIG. 8. For the present disclosure, two NODEs may be alternately trained using the loss functions $L_h$ and $L_a$. Also, other NODEs a(t)(resp. h(0)) may be fixed while training h(t)(resp. a(t)) by applying Lh(resp. $L_a$). Hereinafter, a method of calculating all gradients except for $\nabla \theta_{others} L_h$ in the algorithm will be briefly described.

For training according to the present disclosure, it is possible to calculate the gradient of loss (gradient of loss) with respect to NODE parameters $\theta_f$ and $\theta_g$. Here, a space-efficiently computation method will be described.

First, since $\theta_g$ is fixed and a(t) may be regarded as a constant, $\theta_f$ may train using a standard adjoint sensitivity method of NODEs. Therefore, the gradient of $L_h$ with respect to $\theta_f$ may be calculated according to Equation 7 below.

$$\nabla_{\theta_f} L_h = \frac{dL_h}{d\theta_f} = -\int_{t_1}^{t_0} j_{L_h}(t)^\top \frac{\partial f(h(t), a(t), t; \theta_f)}{\partial \theta_f} dt \quad \text{[Equation 7]}$$

Here, $j_{Lh}(t)$ is an adjoin state defined as $$\frac{\partial L_h}{\partial h(t)}.$$

Second, a(t) is connected to $L_a$ through h(t), and thus, may be more complex than the previous case of training $\theta_g$. The gradient of $L_a$ with respect to $\theta_g$ may be defined as in Equation 8 below.

$$\nabla_{\theta_g} L_a = \frac{dL_a}{d\theta_g} = \frac{\partial L_a}{\partial h(t)} \cdot \frac{\partial h(t)}{\partial a(t)} \cdot \frac{\partial a(t)}{\partial \theta_g} = \quad \text{[Equation 8]}$$

$$-\int_{t_1}^{t_0} j_h(t)^\top j_{L_a}(t)^\top \frac{\partial g(h(t), a(t), t; \theta_f)}{\partial \theta_g} dt$$

Here, $j_{La}(t)$ is an adjoint state defined as $$\frac{\partial L_a}{\partial h(t)},$$

and $j_h(t)$ is another adjoint state defined as $$\frac{\partial h(t)}{\partial a(t)}.$$

According to the Cauchy-Kowalevski theorem, for the given $$f(h(t), t; \theta_f) = \frac{dh(t)}{dt},$$

there may be a unique solution of h in the case where f is analytic (or regionally Lipschitz continuous). That is, the ODE problem may be well-posed when the ODE function is analytic.

In the case of the present disclosure, one NODE may be alternately trained after fixing the other NODEs. When training the NODEs, it is possible to assume certain conditions regarding the analytic ODE function. For example, in the experiment according to the present disclosure, the continuous GRU function may be applied for f composed of an analytic operator such as matrix multiplication, matrix addition, and hyperbolic tangent. Therefore, the Cauchy-Kowalevski theorem may be applied in the experiment according to the present disclosure regarding continuous GRU cells. However, non-analytic rectified linear unit (ReLU) activation may be used in image classification experiments. However, the experimental results according to the present disclosure may indicate that the dual co-evolving NODEs may be trained well.

Figure 4:
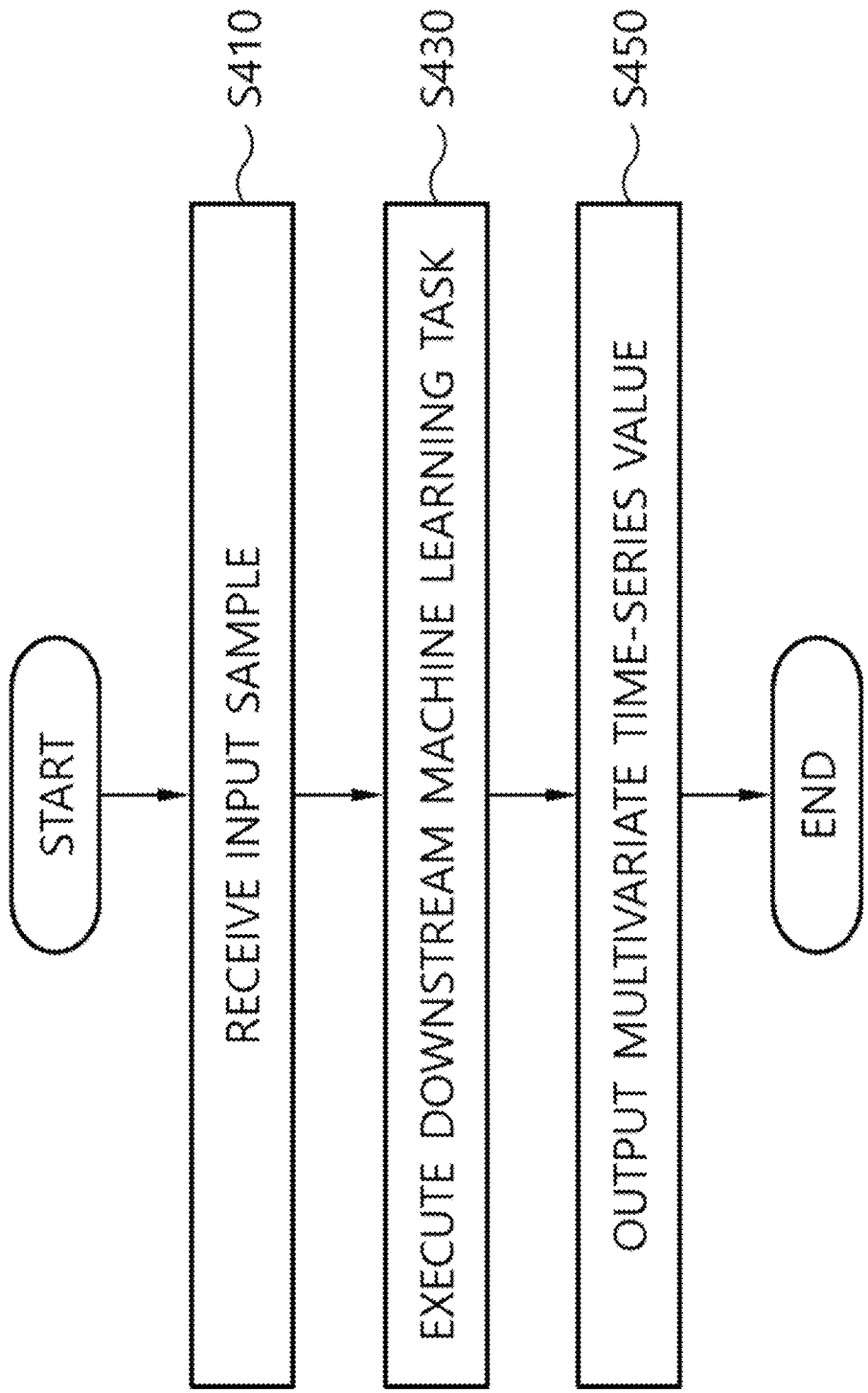
FIG. 4 is a flowchart illustrating a method for an artificial intelligence neural network based on co-evolving neural ordinary differential equations according to the present disclosure.

FIG. 4 is a flowchart for describing a method for an artificial intelligence neural network based on co-evolving neural ordinary differential equations according to the present disclosure.

Referring to FIG. 4, the apparatus 130 for an artificial intelligence neural network may receive an input sample through the main neural ordinary differential equation (NODE) module 310 (step S410). Thereafter, the apparatus 130 for an artificial intelligence neural network may execute a downstream machine learning task through the main NODE module 310 (step S430), and as a result, output a multivariate time-series value (step S450).

In this case, the apparatus 130 for an artificial intelligence neural network may provide the attention according to the dual co-evolving NODE process to the main NODE module 310 through the attention NODE module 330, and thus, the main NODE module 310 and the attention NODE module 330 may influence each other over time.

Hereinafter, experimental contents of the apparatus and method for an artificial intelligence neural network according to the present disclosure will be described with reference to FIGS. 9 to 12. Specifically, FIG. 9A shows the architecture of the ODE-Net network f for MNIST image classification, FIG. 9B is the MNIST experimental results, and FIG. 9C is the SVHN experimental results. Also, FIG. 10A is the CIFAR10 experiment results, FIG. 10B is an image feature Silhouette score, and FIG. 10C is the USHCN-DAILY time-series prediction experiment results. Also, FIG. 11A is the PhysioNet time-series classification results, and FIG. 11B is the PhysioNet time-series regression results (MSE). Also, FIG. 12A is human activity time-series classification results, FIG. 12B is image classification results according to a model size, and FIG. 12C is time-series classification results according to an attention type.

First, image classification and time-series prediction experiments are performed here. All experiments may be performed in the following software and hardware environments. That is, Ubuntu 18.04 LTS, Python 3.6.6, Numpy 1.18.5, Scipy 1.5, Matplotlib 3.3.1, PyTorch 1.2.0, CUDA 10.0 and NVIDIA Driver 417.22, i9 CPU, and NVIDIA RTX Titan. Training and test operations are iteratively performed using five different random seeds and mean and standard deviation accuracies are observed.

Experiment 1) Image Classification

Datasets and Baselines: Here, benchmark datasets MNIST, SVHN, and CIFAR10 are used. We compare the method (ACEODE-Net) according to the present disclosure (ACEODE-Net) with ResNet, RKNet, ODE-Net, and Augmented-ODENet according to a given evaluation protocol. A downsampling layer to which six standard residual blocks are connected can be applied to ResNet. For the RK-Net and ODE-Net, the residual block may be replaced with a NODE layer, which may be different depending on the ODE solver selection. The RK-Net may use a fourth-order Runge-Kutta method, and the ODE-Net may use a Dormand-Prince method adaptive to forward-pass inference. Both the cases may be trained with the adjoint sensitivity method, which is the standard backward pass gradient calculation method for NODEs. In the case of the Augmented-ODE-Net, a predetermined augmentation (Augmentation) method may be used. Therefore, to construct the ACE-ODE-Net, the NODEs layer of the ODE-Net can be replaced with the dual co-evolving NODEs according to the present disclosure without modification of other layers. Hyperparameters and ODE Functions: Test the following hyperparameters against methods and other baselines.

(1) In the case of the RKNet and ODE-Net, the ODE function f is as illustrated in FIG. 9A. There is no attention in these two models.
(2) In the case of the Augmented-ODE-Net, we extend ODE-Net with five additional dimensions as described above.
(3) For the fair comparison between ACE-ODE-Net and Augmented-ODENet, the augmentation on the ACE-ODE-Net is not used.
(4) To make the model as light as possible for the ODE function f' of the ACE-ODE-Net, the second layer is removed from FIG. 9A.
(5) The same architecture as in FIG. 9A is used for the ODE function g' of the ACE-ODE-Net.
(6) Two similar convolutional layers are applied to the initial attention generator q of the ACE-ODE-Net.
(7) All in all, the model according to the present disclosure is the same as the ODE-Net except for the co-evolving attention.
(8) 160 epochs are trained with a batch size 128 with a learning late $\{1.0e-3, 5.0e-2, 1.0e-2\}$ and a coefficient $\lambda$ of $\{1.0e-3, 1.0e-4\}$. While training, validation is made with their validation datasets. The default ODE solver is DOPRI.
(9) Each dataset has a different image size, and the number of parameters in each dataset may vary as if the overall architecture is the same. That is, the input and output sizes are different from one dataset to another.

Experimental Results: As illustrated in FIG. 9B for MNIST, ACEODE-Net shows the best mean accuracy with the smallest standard deviation. ODE-Net does not outperform ResNet in all cases. Considering that ODE-Net has fewer parameters than that of ResNet, this may be acceptable. Surprisingly, however, the method according to the present disclosure outperforms ResNet in most cases with much smaller number of parameters (for example, 0.58M of ResNet vs 0.28M of ACE-ODENet).

This result shows the efficacy of the attention mechanism for NODEs. Considering the high standard deviation, RKNet sometimes shows unreliable performance than other methods. In CIFAR10, the method according to the present disclosure shows the second best accuracy after ResNet. However, ResNet is almost twice as large as the model according to the present disclosure in terms of the number of parameters. In SVHN, the method according to the present disclosure shows the best accuracy again.

To analyze the efficacy of the attention mechanism in image representation learning, we run the K-Means clustering algorithm with the hidden representations generated by various methods and evaluate the quality of clustering with a silhouette score. As illustrated in FIG. 10B, the method according to the present disclosure shows the largest score, which means the highest quality of clustering. Augmented-ODE-Net slightly improves the clustering quality of ODE-Net. A similar pattern is observed in other datasets.

Experiment 2) US Historical Climate Network (USHCN) Climate Forecasting

Datasets and Baselines: Here, the experimental environment of GRU-ODE-B ayes, a state-of-the-art NODEs model for time-series prediction, is reused. USHCN data with regional temperature values is used.

ACE-GRU-ODE-B ayes compares with GRU-ODE-B ayes, Augmented-GRU-ODE-Bayes, NODE-VAE, sequential VAE, and various GRU and LSTM based models. NODE-VAE uses a two-layer MLP as an ODE function. Sequential-VAE is based on the deep Kalman filter architecture. GRU-Simple, GRU-D and TLSTM are all recurrent neural network-based models.

GRU-ODE-Bayes are extended by replacing the NODEs layer with the dual co-evolving NODE denoted as the ACE-GRU-ODE-B ayes.

Hyperparameters and ODE Functions: Test the following hyperparameters against methods and other baselines.

(1) In the case of Augmented-GRU-ODE-B ayes, we extend GRUODE-Bayes with 5 additional dimensions as described above.
(2) For the fair comparison with Augmented-GRU-ODE-Bayes, the augmentation for the ACE-GRU-ODE-Bayes is not used.
(3) For the ODE function f' and g' of ACE-GRU-ODE-B ayes, a continuous GRU cell modeling the GRU cell with ODE is used through Equation 3 above.
(4) For the initial attention generator q of the ACE-GRU-ODE-B ayes, we do not use neural networks but calculate the correlation matrix of h(0) and set it as a(0). This approach results in not only accuracy enhancement but also lightweightness.
(5) All in all, the model according to the present disclosure is the same as the ODE-Net except for the co-evolving attention.
(6) 300 epochs with a batch size 300 with a learning rate of $\{1.0e-5, 1.0e-4, 1.0e-3\}$, a dropout rate is $\{0, 0.1, 0.2, 0.3\}$, a coefficient $\lambda$ of $\{0.1, 0.03, 0.01, 0.003, 0.001, 0.0001, 0\}$ are trained. While training, 5-fold cross validation is used.

Experimental Results: All results are illustrated in FIG. 10C. Mean squared error (MSE) and negative log likelihood (NegLL) are used to evaluate each method. Among all the baselines, GRUODE-B ayes shows the best performance in two evaluation metrics. The method according to the present disclosure provides significant performance over GRU-ODE-Bayes, demonstrating the efficacy of the attention mechanism.

Experiment 3) PhysioNet Mortality Classification

Datasets and Baselines: PhysioNet computing from the cardiology challenge dataset published in 2012 is used here. That is, it is to predict the mortality rate of intensive care unit (ICU) populations. The dataset has been collected from 12,000 ICU stays. They remove short stays less than 48 hours and recorded up to 42 variables. Each record has a times tamp that indicates an elapsed time after admission to the ICU. In the experiment, given a record, it predicts whether a patient will die or not.

The state-of-the-art baselines for this dataset are various RNN models and NODE models, which mainly compares with LatentODE which is specialized to irregular time-series datasets.

Hyperparameters and ODE Functions: Test the following hyperparameters against methods and other baselines.
(1) In the encoder-decoder baseline, 20 latent dimensions in the generative model, 40 dimensions in the recognition model, and a batch size of 50 are used. The ODE function of various NODE-based baselines has 3 fully connected (FC) layers with 50 units. We used a 20 dimensional hidden state in autoregressive baselines.
(2) For the Augmented-ODE-Net, we extend h(t) of LatentODE with five additional dimensions as described above.
(3) For fair comparison between ACE-Latent-ODE and Augmented-Latent-ODE, augmentation on ACE-Latent-ODE is not used.
(4) The same 3 fully connected (FC) layers with 50 units for the ODE functions f' and g' of ACE-Latent-ODE are used.
(5) For the initial attention generator q of ACE-ODE-Net, we do not use neural networks but calculate a correlation matrix of h(0) and set it as a(0).
(6) All in all, the model according to the present disclosure is the same as the Latent-ODE except for the co-evolving attention.
(7) 30 epochs is trained with a batch size 50 with a learning rate of {1.0e-5, 1.0e-4, 1.0e-3} and a coefficient $\lambda$ of {0.1, 0.03, 0.01, 0.003, 0.001, 0.0001, 0}. While training, validation is made with their validation datasets.

Experimental Results: Latent-ODEs with the dual co-evolving NODEs according to the present disclosure, denoted ACE-Latent-ODEs, show the best AUC score. After then, ODE-RNN and Latent-ODE are positioned. In the original setting, Latent-ODE (ODE Enc.) is inferior to ODE-RNN. However, after adding attention according to the present disclosure, it outperforms ODE-RNN, which shows the efficacy of the attention mechanism according to the present disclosure.

Experiment 4) PhysioNet Mortality Regression

Datasets and Baselines: Here, we use the same PhysioNet dataset for a regression task. We interpolate and extrapolate the patient's vital sign data in the task. Here, each patient record is divided into training, validation, an interpolation test, and extrapolation test periods.

Hyperparameters and ODE Functions: Modify the decoder in the encoder-decoder architecture used for the previous classification. The last activation layer of the decoder is changed to a fully connected layer with an output size of 42, that is, the number of sensors, and solves the integral problem of the NODEs-based decoder several times according to the target set of points to be predicted. In the previous classification, there is only one sigmoid activation. Here, we test using the same set of hyperparameters.

Experimental Results: Augmented-Latent-ODE slightly improves Latent-ODE for extrapolation, and ACE-Latent ODE shows the best accuracy for extrapolation. In FIG. 10C, the MSE of various methods during the extrapolation period are displayed. The ACE-Latent-ODE may successfully reduce errors for some time points where the Latent ODE and Augmented-Latent-ODE show relatively higher errors.

Experiment 5) Human Activity Classification

Datasets and Baselines: The Human Activity dataset contains data from five people performing several activities (walking, falling, lying down, standing up from lying, etc.) with four sensors at left ankle, right ankle, belt, and chest. The original data creator let them repeat five times for each performance to collect reliable data. Here, each time point of a person is classified as one of seven activities. The state-of-the-art baseline for this dataset is Latent-ODE.

Hyperparameters and ODE Functions: Test the following hyperparameters against methods and other baselines.
(1) In encoder-decoder baselines, 15 latent dimensions in the generative model, 100 dimensions in the recognition model, and a batch size of 50 are used. The ODE function of various NODEs-based baselines have 3 fully connected (FC) layers with 50 units. 15 dimensional hidden state in the autoregressive baseline is used.
(2) For the ODE functions f' and g' of ACE-Latent-ODE, the same 3 fully connected (FC) layers with 50 units are used.
(3) For the initial attention generator q of ACE-ODE-Net, we do not use neural networks but calculate a correlation matrix of h(0) and set it as a(0).
(4) All in all, the model according to the present disclosure is the same as the Latent-ODE except for the co-evolving attention.
(5) 70 epochs is trained with a batch size 50 with a learning rate of {1.0e-5, 1.0e-4, 1.0e-3} and a coefficient $\lambda$ of {0.1, 0.03, 0.01, 0.003, 0.001, 0.0001, 0}. While training, validation is made with their validation datasets.

Experimental Results: According to the present disclosure, ACE-Latent-ODE may outperform other methods including Augmented-ODE and LatentODE. Surprisingly, Augmented-ODE may not improve the Latent-ODE, which sometimes happens. The ODE-RNN, which showed good performance for PhysioNet, may not show good accuracy in the corresponding dataset.

The apparatus for an artificial intelligence neural network based on co-evolving neural ordinary differential equations according to the present disclosure may implement the dual co-evolving NODEs method to describe the cross-evolutionary process of hidden vectors and attention. In addition, to show the efficacy of the method according to the present disclosure, in-depth experiments were performed using various modern NODEs models for various downstream tasks ranging from image classification to time-series prediction. The method according to the present disclosure may provide a lasting performance improvement over the existing NODE-based baselines. Also, it may be important to initialize the initial attention denoted by a(0), in pairwise attention, and the apparatus for an artificial intelligence neural network based on co-evolving neural ordinary differential equations according to the present disclosure may implement a method using a correlation matrix of h(0).

Although exemplary embodiments of the present disclosure have been disclosed hereinabove, it may be understood by those skilled in the art that the present disclosure may be variously modified and altered without departing from the scope and spirit of the present disclosure described in the following claims.

DETAILED DESCRIPTION OF MAIN ELEMENTS

| | |
|---|---|
| 100: System for an artificial intelligence neural network | |
| 110: User terminal | 130: Apparatus for an artificial intelligence neural network |
| 150: Database | |
| 210: Processor | 230: Memory |
| 250: User input/output unit | 270: Network input/output unit |
| 310: Maine NODE module | 330: Attention NODE module |
| 350: Feature extraction module | 370: Initial attention generation module |
| 390: Classification module | |

What is claimed is:

1. An apparatus for an artificial intelligence neural network based on co-evolving neural ordinary differential equations (NODEs), the apparatus comprising:
at least one processor and memory storing instructions performed by the at least one processor;
a main NODE module configured to provide a downstream machine learning task at an initial time; and
an attention NODE module configured to receive the downstream machine learning task from the main NODE module and provide attention to the main NODE module based on the downstream machine learning task,
wherein the main NODE module receives the attention provided from the attention NODE module and provides the downstream machine learning task at a next time after the initial time such that the main NODE module and the attention NODE module influence each other over time so that the main NODE module outputs a multivariate time-series value at a given time for an input sample x,
wherein the attention is used in a feature extraction layer before a NODE layer and does not introduce a new NODE model that is internally combined with the attention,
wherein Explainable Tensorized Neural (ETN)-ODE uses the attention to derive a correlation matrix in the feature extraction layer and then evolve the correlation matrix using the NODE layer, and
wherein the main NODE module and the attention NODE module are each implemented via the at least one processor.

2. The apparatus of claim 1, further comprising: a feature extraction module configured to extract a feature for the input sample x to generate an initial feature vector at the initial time, and provide the initial feature vector to the main NODE module,
wherein the feature extraction module is implemented via the at least one processor.

3. The apparatus of claim 2, further comprising: an initial attention generating module configured to receive the initial feature vector to generate initial attention, and provide the initial attention to the attention NODE module to support calculation of a multivariate time-series value at a next time,
wherein the initial attention generating module is implemented via the at least one processor.

4. The apparatus of claim 1, wherein the main NODE module performs integration of an ordinary differential equation (ODE) function with respect to the ODE function for time, and the ODE function receives 1) the multivariate time-series value and 2) the attention at the given time.

5. The apparatus of claim 4, wherein the attention NODE module performs element-wise multiplication between the multivariate time-series value and a sigmoid activation function of a time-evolving matrix as the ODE function.

6. The apparatus of claim 4, wherein the attention NODE module performs integration of an attention generation function for the ODE function for time, and the attention generation function receives 1) a time evolution matrix representing a logit value of the attention and 2) the multivariate time-series value is input at the given time.

7. The apparatus of claim 1, further comprising: a classification module configured to receive the multivariate time-series value at the given time and performs prediction on the input sample x,
wherein the classification module is implemented via the at least one processor.

8. A method for an artificial intelligence neural network based on co-evolving neural ordinary differential equations (NODEs), the method comprising:
providing, by a main NODE module, a downstream machine learning task at an initial time; and
receiving, by an attention NODE module, the downstream machine learning task from the main NODE module and providing attention to the main NODE module based on the downstream machine learning task,
wherein the main NODE module receives the attention provided from the attention NODE module and provides the downstream machine learning task at a next time such that the main NODE module and the attention NODE module influence each other over time so that the main NODE module outputs a multivariate time-series value at a given time for an input sample x,
wherein the attention is used in a feature extraction layer before a NODE layer and does not introduce a new NODE model that is internally combined with the attention,
wherein Explainable Tensorized Neural (ETN)-ODE uses the attention to derive a correlation matrix in the feature extraction layer and then evolve the correlation matrix using the NODE layer.

9. The method of claim 8, further comprising:
extracting, by a feature extraction module, a feature for the input sample x to generate an initial feature vector at the initial time, and providing the initial feature vector to the main NODE module.

10. The method of claim 9, further comprising:
receiving, by an initial attention generating module, the initial feature vector to generate initial attention, and providing the initial attention to the attention NODE module to support calculation of a multivariate time-series value at a next time.

11. The method of claim 8, wherein the main NODE module performs integration of an ordinary differential equation (ODE) function with respect to adjoint times, and the ODE function receives 1) the multivariate time-series value and 2) the attention at the given time.

12. The method of claim 8, further comprising:
receiving, by a classification module, the multivariate time-series value at the given time and performing prediction on the input sample x.

* * * * *